(12) United States Patent
He et al.

(10) Patent No.: US 9,455,478 B2
(45) Date of Patent: Sep. 27, 2016

(54) EV BATTERY PACK WITH BATTERY COOLING ASSEMBLY AND METHOD

(71) Applicant: FORD GLOBAL TECHNOLOGIES, LLC, Dearborn, MI (US)

(72) Inventors: Chuan He, Northville, MI (US); Xiaoguang Chang, Northville, MI (US); Xu Wang, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 14/149,103

(22) Filed: Jan. 7, 2014

(65) Prior Publication Data

US 2015/0194712 A1 Jul. 9, 2015

(51) Int. Cl.
*H01M 10/42* (2006.01)
*H01M 2/12* (2006.01)
*H01M 10/6557* (2014.01)
*H01M 10/625* (2014.01)
*H01M 10/6556* (2014.01)
*H01M 10/6551* (2014.01)
*H01M 10/613* (2014.01)

(52) U.S. Cl.
CPC ....... *H01M 10/4207* (2013.01); *H01M 2/1252* (2013.01); *H01M 10/613* (2015.04); *H01M 10/625* (2015.04); *H01M 10/6551* (2015.04); *H01M 10/6556* (2015.04)

(58) Field of Classification Search
CPC ......... H01M 2/1252; H01M 10/4207; H01M 6/5038; H01M 10/613
See application file for complete search history.

(56) References Cited

U.S. PATENT DOCUMENTS

| 5,582,929 | A | 12/1996 | Dechovich | |
|---|---|---|---|---|
| 2009/0111009 | A1* | 4/2009 | Goesmann | H01G 2/08 429/120 |
| 2009/0142628 | A1 | 6/2009 | Okada et al. | |
| 2009/0246606 | A1 | 10/2009 | Shimizu | |
| 2009/0274952 | A1* | 11/2009 | Wood | B60L 11/1874 429/99 |
| 2011/0059354 | A1* | 3/2011 | Kao | H01M 2/105 429/186 |
| 2011/0293974 | A1* | 12/2011 | Yoon | H01M 2/1083 429/72 |
| 2012/0148889 | A1* | 6/2012 | Fuhr | H01M 2/1077 429/87 |
| 2012/0298433 | A1 | 11/2012 | Ohkura | |
| 2013/0192807 | A1 | 8/2013 | DeKeuster | |
| 2013/0202926 | A1* | 8/2013 | Yoon | H01M 2/1022 429/82 |

FOREIGN PATENT DOCUMENTS

WO WO 2012102496 A2 8/2012
WO WO 2013089509 A1 6/2013

OTHER PUBLICATIONS

Yeow, K., Teng, H., Thelliez, M., and Tan, E., "Thermal Analysis of a Li-ion Battery System with Indirect Liquid Cooling Using Finite Element Analysis Approach," SAE Int. J. Alt. Power. 1(1):65-78, 2012, doi:10.4271/2012-01-0331.
Buford, K., Williams, J., and Simonini, M., "Determining Most Energy Efficient Cooling Control Strategy of a Rechargeable Energy Storage System," SAE Technical Paper 2011-01-0893, 2011, doi:10.4271/2011-01-0893.

* cited by examiner

*Primary Examiner* — Stewart Fraser
(74) *Attorney, Agent, or Firm* — David Kelley, Esq.; Tung & Associates

(57) ABSTRACT

An electric vehicle battery pack includes an array of battery cells each cell having an upper cell surface and a lower cell surface, the lower cell surface having a positive and a negative terminal; and a thermal assembly in thermally-conductive contact with the upper cell surfaces of the array. A battery pack cooling method is also disclosed.

20 Claims, 3 Drawing Sheets

EV BATTERY PACK WITH BATTERY COOLING ASSEMBLY AND METHOD

FIELD

Illustrative embodiments of the disclosure are generally directed to battery packs for electric vehicles (EVs), and other directly or indirectly used battery packs. More particularly, illustrative embodiments of the disclosure are directed to an EV battery pack with battery cooling assembly and a method which facilitate uniform and efficient cooling of EV batteries.

BACKGROUND

Due to the requirements of a high efficiency, low-cost system to transfer heat which is generated by battery cells with minimum power and volume, EV battery packs may utilize a liquid-cooled pad.

Accordingly, an EV battery pack with battery cooling assembly and method which facilitates uniform and efficient cooling of EV batteries may be desirable.

SUMMARY

Illustrative embodiments of the disclosure are generally directed to an electric vehicle battery pack with battery cooling assembly. An illustrative embodiment of the electric vehicle battery pack includes an array of battery cells each cell having an upper cell surface and a lower cell surface, the lower cell surface having a positive and a negative terminal; and a thermal assembly in thermally-conductive contact with the upper cell surfaces of the array.

Illustrative embodiments of the disclosure are further generally directed to a battery pack cooling method. An illustrative embodiment of the battery pack cooling method includes inverting an array of battery cells of an electric vehicle battery pack having an upper cell surface and a lower cell surface, the lower cell surface having a positive and a negative terminal; applying a thermal assembly to the upper cell surfaces of the array; and circulating coolant through the thermal assembly.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 1:
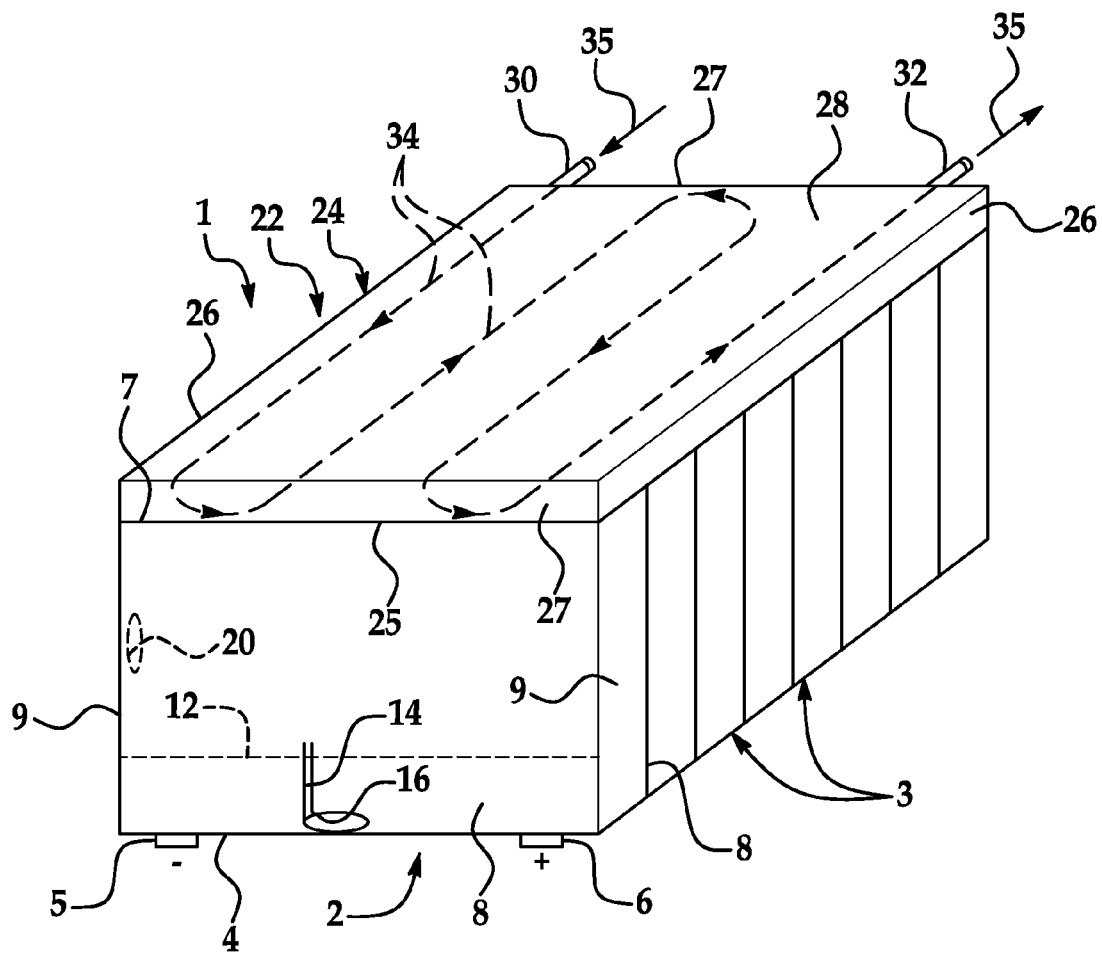
FIG. 1 is a perspective view of a portion of an illustrative embodiment of an EV battery pack fitted with a battery cooling assembly.
Figure 1A:
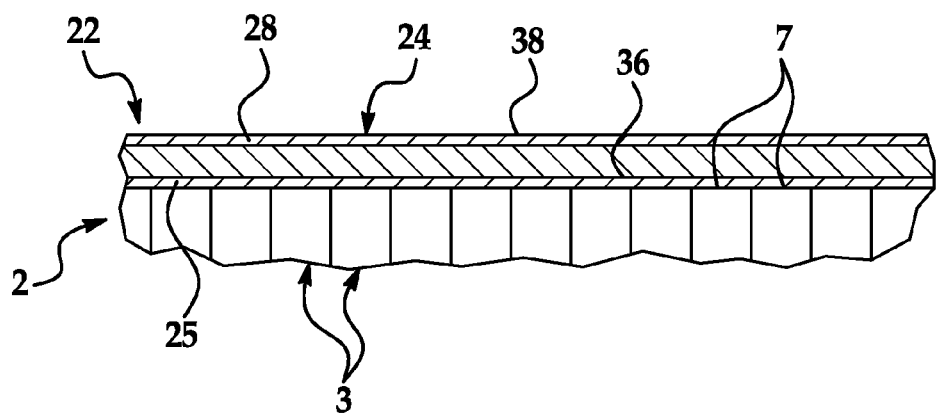
FIG. 1A is a cross-sectional view of the junction between a battery cell array and a battery pack cooling pad according to an illustrative embodiment of the EV battery pack with battery cooling assembly.
Figure 2:
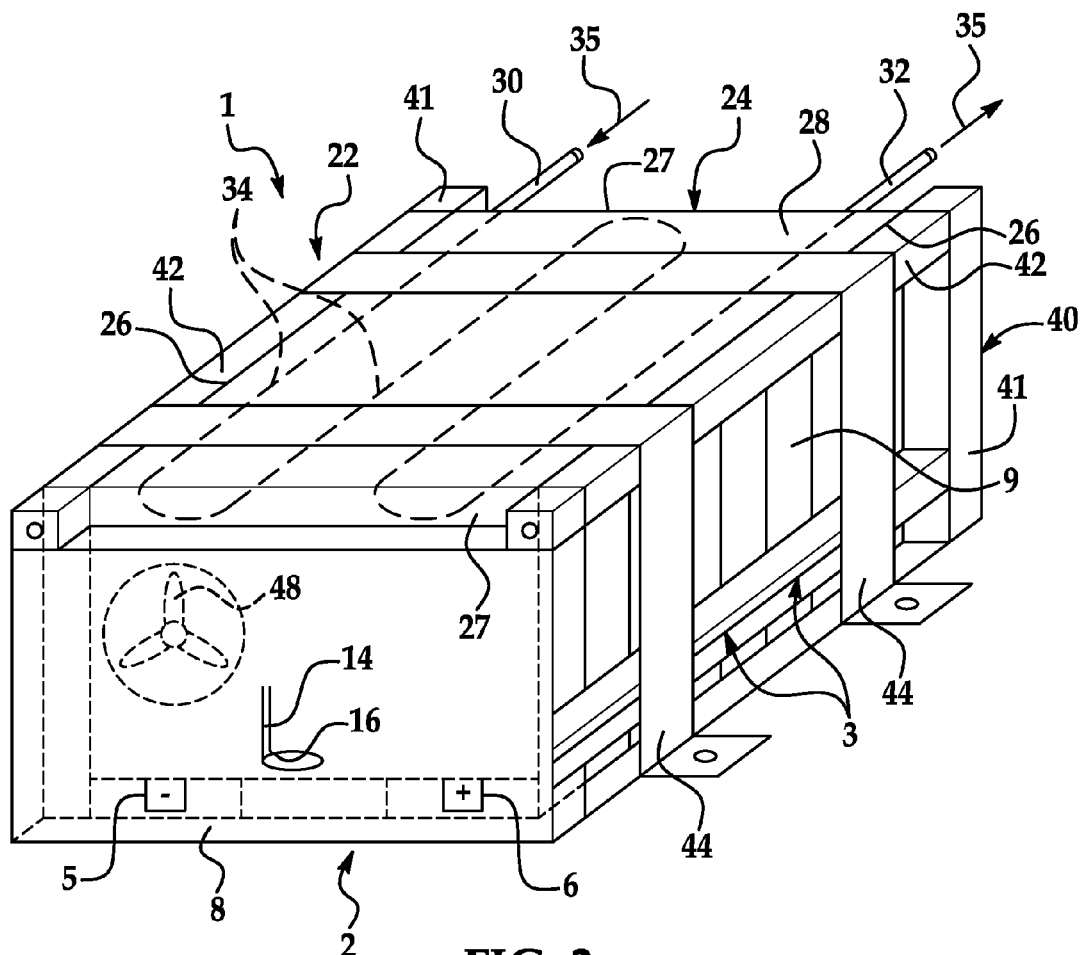
FIG. 2 is a perspective view of an illustrative embodiment of a portion of an EV battery pack fitted with a battery cooling assembly having a battery pack frame.
Figure 2A:
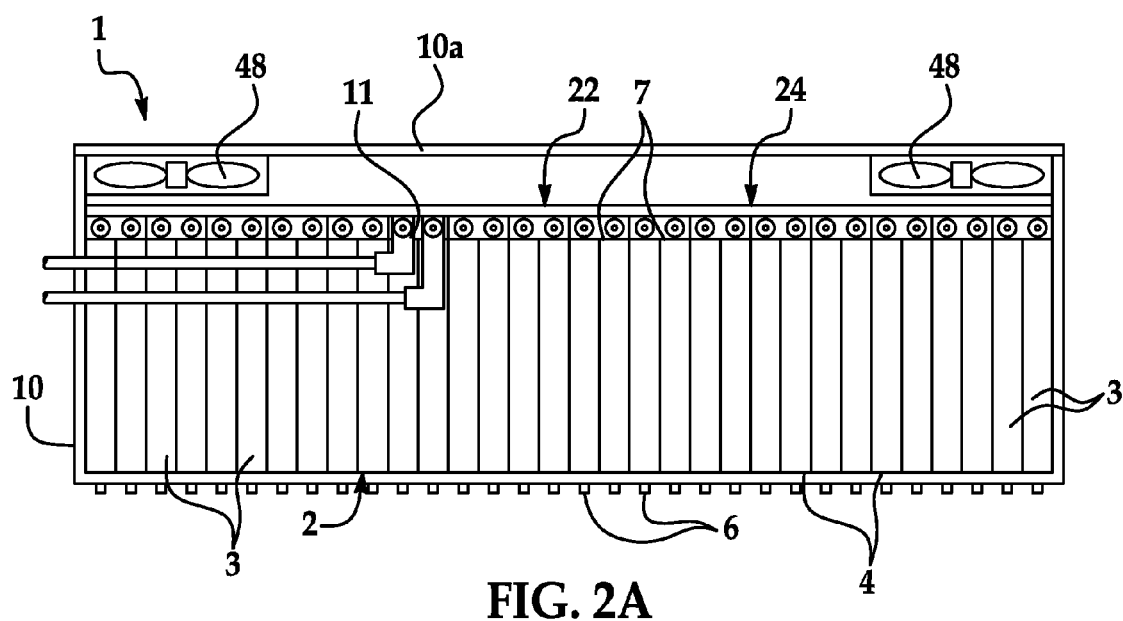
FIG. 2A is a side view of an EV battery pack fitted with a battery cooling assembly.

Referring initially to FIGS. 1, 1A, 2 and 2A, an illustrative embodiment of a thermal assembly such as a battery cooling assembly 22 placed in thermal contact with an EV (Electric Vehicle) battery cell array 2 in an EV battery pack 1 is shown. The EV battery pack 1 may be suitable for implementation in an electric vehicle such as an HEV (Hybrid Electric Vehicle), for example and without limitation. The EV battery pack 1 may include a battery pack housing 10 having a housing cover 10a and in which is contained at least one battery cell array 2 having multiple, adjacent battery cells 3. As shown in FIG. 2A, a bus bar 11 may be disposed in electrical contact with the battery cells 3 in each battery cell array 2 Each battery cell 3 may include an upper battery cell surface 4 having a negative terminal 5 and a positive terminal 6. Each battery cell 3 may further include a lower battery cell surface 7 which is opposite the upper battery cell surface 4, a pair of spaced-apart end battery cell surfaces 8 and a pair of spaced-apart side battery cell surfaces 9 extending between the end battery cell surfaces 8. Each battery cell 3 may contain an electrolyte solution 12. A vent conduit 14 may communicate with the electrolyte solution 12. At least one end vent opening 16 which communicates with the vent conduit 14 may be provided in one of the end battery surfaces 8. Additionally or alternatively, at least one side vent opening 20 may be provided in one of the side battery surfaces 9 of each battery cell 3.

The battery cooling assembly 22 may include a battery pack cooling pad 24. In some embodiments, the battery cooling pad 24 may be generally elongated and rectangular with a battery contact surface 25, a pad outer surface 28 and a pair of side pad surfaces 26 and a pair of end pad surfaces 27 extending between the battery contact surface 25 and the pad outer surface 28. The battery cooling pad 24 may include any thermally-conductive metal, plastic and/or other material to increase heat transfer between battery cells and cooling pad.

As further shown in FIG. 1, a coolant inlet 30 and a coolant outlet 32 may extend from the battery pack cooling pad 24. A coolant path 34 may extend through the battery pack cooling pad 24 in fluid communication with the coolant inlet 30 and the coolant outlet 32. In some embodiments, the coolant inlet 30 and the coolant outlet 32 may extend from the end pad surface 27 in spaced-apart relationship to the coolant inlet 30, as shown. The coolant path 34 may extend in a winding, serpentine path from the coolant inlet 30 to the coolant outlet 32. The winding cooling path is one example, any other cooling path pattern can be used also, for example, several parallel line coolant paths from one end of cooling pad to another end.

As shown in FIG. 2, in some embodiments, at least one cooling fan 48 may be installed around the battery cell array 2 to impart uniform battery cell temperature. The cooling fan 48 could be powered by either solar or battery. As shown in FIG. 2A, in some embodiments, at least one cooling fan 48 may be provided inside the battery pack housing 10 above the battery cell array 2. The location of the cooling fan or fans 48 may be optimized for the best air circulation, lowest noise and minimum power consumption according to the knowledge of those skilled in the art. To maximize the air circulation, the spacer can be installed between neighboring cells.

Figure 2B:
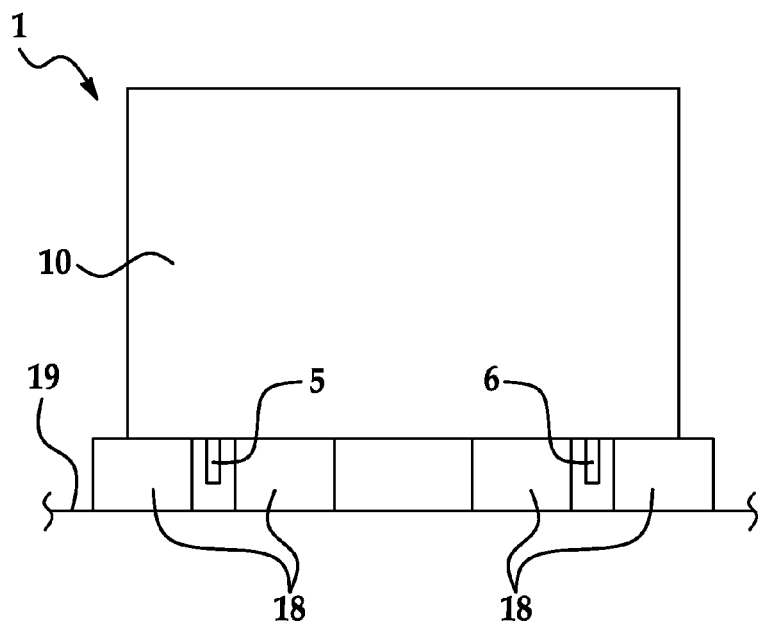
FIG. 2B is an end view of an EV battery pack with a battery cooling assembly, the battery pack supported on a support surface by battery cell supports.

With the battery cell array 2 in an inverted position and the upper battery cell surface 4 facing downwardly and the lower battery cell surface 7 facing upwardly, the battery pack cooling pad 24 may be placed in thermally-conductive contact with the lower battery cell surfaces 7 of the respective battery cells 3. The lower battery cell surfaces 7 and the battery contact surface 25 of the battery pack cooling pad 24 may be rendered sufficiently smooth that the battery pack cooling pad 24 can "stick" to the battery cells 3 seamlessly. As shown in FIG. 1A, in some embodiments, a thermally conductive layer 36, such thermal compound may be sandwiched between the battery contact surface 25 of the battery pack cooling pad 24 and the lower battery cell surfaces 7 of the respective battery cells 3. Thermal compound fills the space between the bottom of cell and cooling pad, and improve the thermal transfer from battery cell to cooling pad. A thermally insulating layer 38 may be placed on the pad outer surface 28 of the battery pack cooling pad 24, to further protect battery from performance degradation due to thermal soak. Generally speaking, it is recommended to reduce battery power to avoid some safety issues when cell temperature is high. Pressure may be applied against the battery pack cooling pad 24 to press the battery pack cooling pad 24 and the battery cell array 2 together to ensure that the lower battery surfaces 7 of the battery cells 3 are tightly connected with the battery contact surface 25 of the battery pack cooling pad 24. As shown in FIG. 2B, in some embodiments, the EV battery pack 1 may be supported by multiple battery cell supports 18 which support the negative terminals 5 and the positive terminals 6 of the battery cells 3 in the battery cell array 2 over a support surface 19.

In exemplary application, the battery cell array 2 is inverted such that the upper battery cell surfaces 4 of the respective battery cells 3 face downwardly and the lower battery cell surfaces 7 face upwardly. The battery cooling pad 24 is applied to the lower battery surfaces 7 of the battery cells 3, as was heretofore described with respect to FIG. 1. As shown in FIG. 2, the inverted battery cell array 2 and battery cooling pad 24 may be secured in a battery pack frame 40 which protects the battery cell array 2 and battery pack cooling pad 24 from damage due to vibration when the electric vehicle in which the EV battery pack 1 is installed traverses rough surfaces. The battery array frame 40 may support the inverted battery cells 3 and the battery pack cooling pad 24 above the battery cells 3 and may compress the cells to increase the life of the cells.

The battery array frame 40 may have any design or construction which is suitable for the purpose. In some embodiments, the battery array frame 40 may be thermally conductive metal and/or other material and may include multiple corner frame members 41 which are placed at the respective corners of the battery cell array 2. Side frame members 42 may extend between the corner frame members 41 along the respective longitudinal edges of the battery cell array 2. The side frame members 42 may be fitted with frame mount brackets 44 which facilitate bolted and/or other attachment of the EV battery pack to the electric vehicle and to ensure the cells are compressed inside vehicle to extend the life of battery cells.

Throughout operation of the EV battery pack 1, heat may be generated inside the battery cells 3 of the battery cell array 2. Liquid coolant 35 may be circulated through the coolant inlet 30, coolant path 34 and coolant outlet 32, respectively. Thus, heat is dissipated from the interiors of the battery cells 3 to the circulating coolant 35. The battery cell is filled full or partially with electrolyte solution 12 (FIG. 1). The cell is cooled by convection through liquid and/or gas from the coolant path 34 at the lower battery cell surfaces to the upper battery cell surfaces 4 of the respective inverted battery cells 3. The cooled electrolyte solution 12 dissipates heat from the upper battery cell surfaces 4 of the battery cells 3. Additional cooling may occur by conduction from the coolant path 34, through the battery pack frame 40 to the upper battery cell surfaces 4, imparting uniformity to the temperature of the battery cells 3. The cooling fan or fans 48 may be operated to further impart uniformity to the temperature distribution within the battery cells 3.

With the more uniform temperature field within each battery cell 3 and increased heat transfer to the lower battery cell surfaces 7, the temperature of the lower battery cell surfaces 7 may be raised. This may substantially improve the cooling pad heat transfer condition due to larger delta temperature between the coolant and the cell to facilitate a lower coolant fluid rate and a higher coolant fluid temperature. The lower requirement on cooling fluid rate and temperature may be met by lowering the cooling fan speed and/or lowering or eliminating extra AC cooling to reduce cooling system cost and increase vehicle fuel economy and available power from the EV battery pack 1. In the event that pressure accumulates in the battery cells 3 and exceeds a predetermined threshold, any gas and/or electrolyte solution 12 may be vented from the battery cells 3 through the end vent opening or openings 16 and/or the side vent opening or openings 20. If due to the upside down installation of the cell, the vent and CID are located at bottom and manufacture prefers to vent gas out of the cell first, special design is needed. For example, a tube 14 may be constructed inside the cell to reach above the electrolyte level to vent out the gas first.

Figure 3:
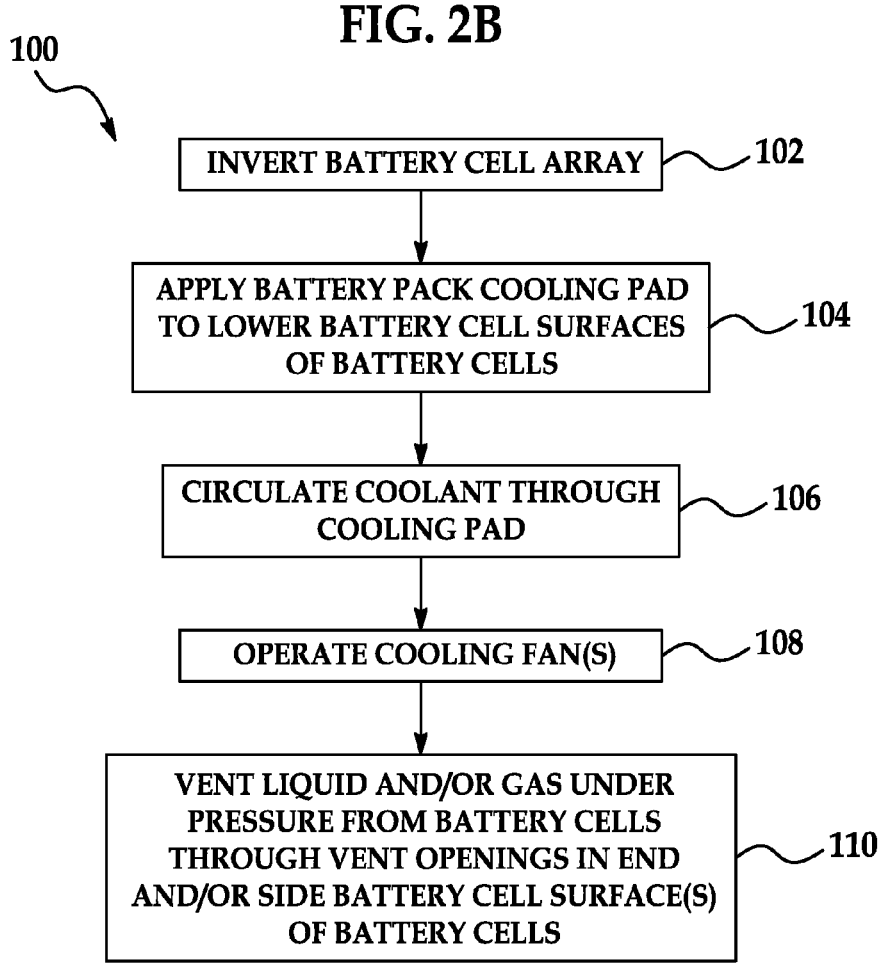
FIG. 3 is a flow diagram of an illustrative embodiment of a battery pack cooling method.

Referring next to FIG. 3, an illustrative embodiment of a battery array cooling method 100 is shown. At block 102, a battery cell array of an EV battery array is inverted with the normally lower battery cell surfaces facing upwardly and the normally upper battery cell surfaces and the negative and positive terminals of each battery cell facing downwardly. At block 104, a battery array cooling pad is applied to the lower battery cell surfaces of the battery cells. At block 106, coolant is circulated through the battery pack cooling pad. At block 108, a cooling fan or fans may be operated to optimize heat transfer and uniformity of cooling. At block 110, liquid and/or gas pressure (fluid pressure) may be vented from the battery cells through vent openings in the end surfaces and/or the side surfaces of the battery cells.

Although the embodiments of this disclosure have been described with respect to certain exemplary embodiments, it is to be understood that the specific embodiments are for purposes of illustration and not limitation, as other variations will occur to those of skilled in the art.

What is claimed is:

1. An electric vehicle battery pack, comprising:
an array of battery cells each cell having an upper cell surface and a lower cell surface, the lower cell surface having a positive and a negative terminal; and
a thermal assembly in thermally-conductive contact with the upper cell surfaces of the array, the array of battery cells and the thermal assembly secured within a battery array frame, said array of battery cells inverted such that lower cell surfaces within said battery array frame are configured to be adjacently disposed to the electric vehicle upon mounting of the battery array frame on the electric vehicle.

2. The electric vehicle battery pack of claim 1 further comprising at least one vent opening in each of the array of battery cells, the at least one vent opening capable of venting gas or liquid.

3. The electric vehicle battery pack of claim 2 wherein the at least one vent opening is in an end battery cell surface of each of the array of battery cells.

4. The electric vehicle battery pack of claim 2 wherein the at least one vent opening is in a side battery cell surface of each of the array of battery cells.

5. The electric vehicle battery pack of claim 1 further comprising at least one cooling fan in the array of battery cells.

6. The electric vehicle battery pack of claim 1 wherein the thermal assembly comprises a coolant inlet, a coolant outlet and a coolant path disposed in fluid communication with the coolant inlet and the coolant outlet and in thermally conductive contact with the upper cell surfaces of the array.

7. The electric vehicle battery pack of claim 6 wherein the coolant path is disposed in a winding serpentine configuration.

8. The electric vehicle battery pack of claim 1 further comprising a thermally conductive layer sandwiched between the array of battery cells and the thermal assembly.

9. The electric vehicle battery pack of claim 1 wherein the battery array frame comprises corner frame members disposed at respective corners of the array of battery cells and side frame members extending between the corner frame members along respective longitudinal edges of the array of battery cells.

10. The electric vehicle battery pack of claim 1 wherein the positive and a negative terminal are supported by respective support members, the support members configured to be supported on a support surface.

11. An electric vehicle battery array, comprising:
an array of battery cells each cell having an upper cell surface and a lower cell surface, the lower cell surface having a positive and a negative terminal; and
a thermal assembly in thermally-conductive contact with the upper cell surfaces of the array; and
a battery array frame securing the thermal assembly on the array of battery cells, the array of battery cells and the thermal assembly secured within the battery array frame, said array of battery cells inverted such that lower cell surfaces within said battery array frame are configured to be adjacently disposed to the electric vehicle upon mounting of the battery array frame on the electric vehicle.

12. The electric vehicle battery pack of claim 11 further comprising at least one vent opening in each of the array of battery cells, the at least one vent opening capable of venting gas or liquid.

13. The electric vehicle battery pack of claim 12 wherein the at least one vent opening is in an end battery cell surface of each of the array of battery cells.

14. The electric vehicle battery pack of claim 12 wherein the at least one vent opening is in a side battery cell surface of each of the array of battery cells.

15. The electric vehicle battery pack of claim 11 further comprising at least one cooling fan in the array of battery cells.

16. The electric vehicle battery pack of claim 11 wherein the thermal assembly comprises a coolant inlet, a coolant outlet and a coolant path disposed in fluid communication with the coolant inlet and the coolant outlet and in thermally conductive contact with the upper cell surfaces of the array.

17. The electric vehicle battery pack of claim 16 wherein the coolant path is disposed in a winding serpentine configuration.

18. The electric vehicle battery pack of claim 16 wherein the battery array frame comprises corner frame members disposed at respective corners of the array of battery cells and side frame members extending between the corner frame members along respective longitudinal edges of the array of battery cells.

19. The electric vehicle battery pack of claim 11 further comprising a thermally conductive layer sandwiched between the array of battery cells and the thermal assembly.

20. The electric vehicle battery pack of claim 11 wherein the battery pack frame comprises a plurality of corner frame members disposed at respective corners of the battery cell array and a plurality of side frame members connecting the plurality of corner frame members.

* * * * *